United States Patent [19]
Glisman

[11] Patent Number: 4,595,040
[45] Date of Patent: Jun. 17, 1986

[54] MORTISE AND TENON JIG

[76] Inventor: Rudy L. Glisman, 1350 Barbara, Selma, Calif. 93662

[21] Appl. No.: 786,054

[22] Filed: Oct. 10, 1985

[51] Int. Cl.$^4$ .......................... B27C 5/10; B65B 1/04
[52] U.S. Cl. ........................................ 144/84; 33/197; 33/566; 144/145.5 GT; 409/130; 409/182
[58] Field of Search .................. 409/130, 182; 144/84, 144/144 R, 144 S, 87, 76; 33/174 G, 97, 98, 102, 103, 197, 562

[56] References Cited

U.S. PATENT DOCUMENTS

| | | | |
|---|---|---|---|
| 504,722 | 9/1893 | Grant et al. | 144/76 |
| 1,397,900 | 11/1921 | Pate | 144/150 |
| 1,748,213 | 2/1930 | Edmond | 144/74 |
| 2,890,730 | 6/1959 | Gottlieb | 144/84 |
| 3,109,466 | 5/1961 | Jones | 408/103 |
| 3,211,026 | 10/1965 | Calahan | 33/197 |
| 3,800,840 | 4/1974 | McCord, Jr. | 144/87 |
| 3,834,435 | 9/1974 | McCord, Jr. | 144/144.5 |
| 3,999,300 | 12/1976 | Ban | 144/144.5 |
| 4,373,562 | 2/1983 | Vernon | 144/144.5 |
| 4,479,523 | 10/1984 | Peterson et al. | 144/144.5 |
| 4,553,336 | 11/1985 | Ponce | 144/144.5 X |

FOREIGN PATENT DOCUMENTS 1175210  12/1969  United Kingdom ............. 144/144.5

*Primary Examiner*—W. D. Bray
*Attorney, Agent, or Firm*—Laubscher & Laubscher

[57] ABSTRACT

A mortise and tenon jig is disclosed, characterized by clamping and adjustment features for use with a router for forming blind or open mortises and tenons in a workpiece. The jig includes a fixed base and a pair of spaced parallel side walls connected therewith to define a longitudinal channel for receiving a workpiece. At least one clamping device is connected with the side walls to clamp the workpiece in a selected position within the channel. A router guide plate is connected with the side walls spaced from and parallel to the base. The router guide plate contains a longitudinal through-slot extending above and affording communication with the channel. A guide is adjustably connected with the guide plate for sliding longitudinal displacement relative to the slot. With the workpiece clamp and the guide adjusted to a selected position, a router is positioned against one end of the guide with its cutting tool arranged in and displaced relative to the slot to cut a mortise from the workpiece. With the router positioned against the other end of the guide and the cutting tool displaced relative to the end of the router guide plate, a tenon is cut in a portion of the workpiece protruding from the channel.

9 Claims, 6 Drawing Figures

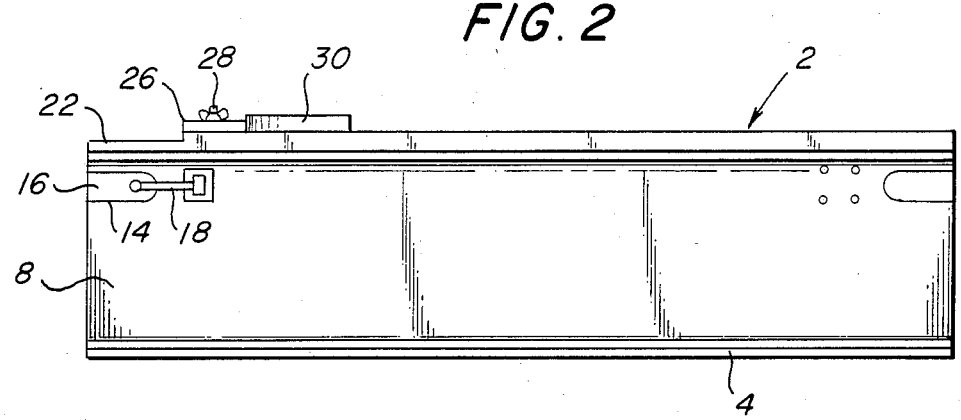
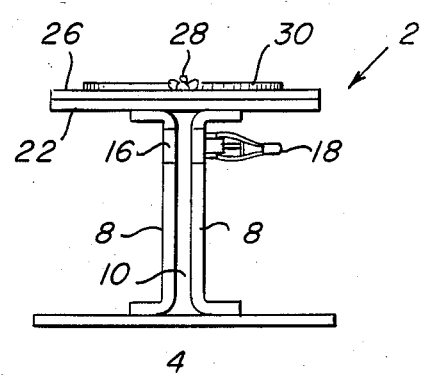
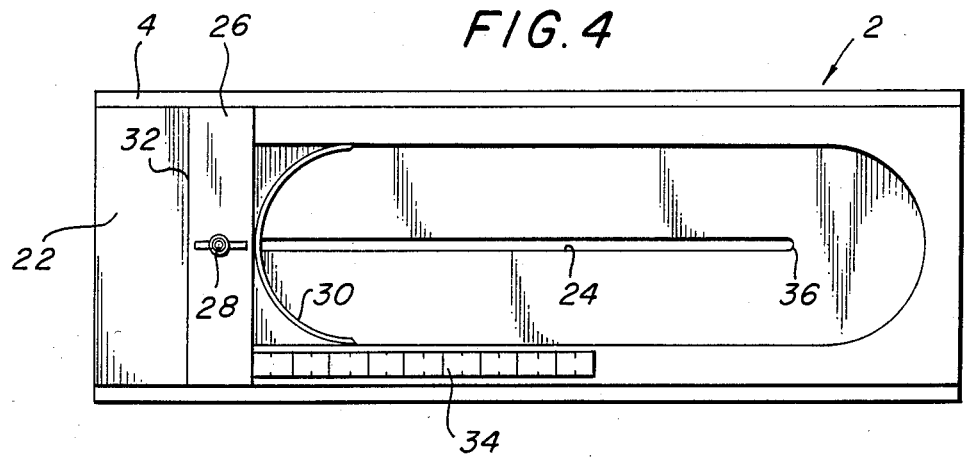
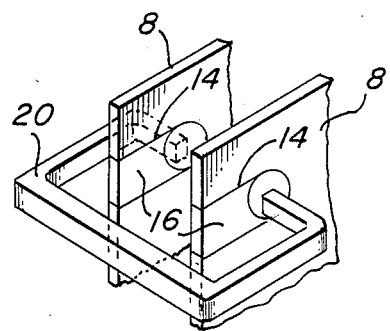

MORTISE AND TENON JIG

BACKGROUND OF THE INVENTION

The present invention relates to a jig useful fo assisting in cutting blind and open mortises and tenons in a workpiece such as a piece of wood with the aid of a router. The device is readily adjustable to control the length of the mortise which may be cut in any location on the workpiece.

BRIEF DESCRIPTION OF THE PRIOR ART

Mortising devices are well-known in the patented prior art as evidenced by the patents to Grant et al U.S. Pat. Nos. 504,722, Pate 1,397,900 and Edmond 1,748,213. The Grant patent, for example, discloses a slotted mortising machine including adjustable attachments for mortising doors and the like.

Also known in the art are various jigs for assisting in cutting or routing workpieces. The Calahan U.S. Pat. No. 3,211,026 discloses a work holder and jig assembly for guiding, drilling and routing operations on a door. Furthermore, the patents to McCord, Jr. U.S. Pat. Nos. 3,800,840 and 3,834,435 disclose dovetail fixtures for clamping and holding a workpiece and for guiding a cutting tool. More particularly, the dovetail fixture of U.S. Pat. No. 3,800,840 is useful for cutting mortises and tenons.

While the prior devices normally operate satisfactorily, they are relatively expensive to manufacture, difficult to set up, and time-consuming to use. Moreover, the prior devices do not afford the high degree of accuracy required in forming mortises and tenons in materials used in the manufacture of cabinetry and furniture.

SUMMARY OF THE INVENTION

Accordingly, it is a primary object of the invention to provide a jig for use with a routing device for forming blind and open mortises in a workpiece such as wood or the like, and also for forming tenons on the workpiece. The jig includes a fixed, planar base plate having a pair of side walls connected therewith. The side walls are arranged normal to the base in a spaced, parallel configuration, thereby to define a longitudinal channel adapted to receive the workpiece. A router guide plate is connected with the side walls in spaced parallel relation to the base plate. The router guide plate thus closes the top of the channel which remains open at its ends. The router guide plate contains a longitudinal through-slot extending above and affording communication with the channel. An adjustable guide is connected with the guide plate for sliding longitudinal displacement relative to the slot. When the workpiece is arranged at a given position within the channel and the guide is adjusted to a selected position, a routing device is positioned against one end of the guide with its cutting tool being arranged in and displaced relative to the slot to cut a mortise in the workpiece within the channel. When the routing device is positioned against the other end of the guide with its cutting tool displaced relative to the end of the router guide plate, a tenon is cut in a portion of the workpiece protruding from the channel.

According to a further object of the invention, the through-slot terminates intermediate the ends of the guide plate.

It is another object of the invention to provide clamping devices on the side walls of the jig for clamping the workpiece in a given position within the channel during the routing operation.

According to a more specific object of the invention, one end of the guide for mortise cutting has a concave configuration and the other end of the guide for tenon cutting has a linear configuration.

BRIEF DESCRIPTION OF THE FIGURES

Other objects and advantages of the subject invention will become apparent from the following specification when viewed in the light of the accompanying drawing, in which:

FIGS. 2-4 are front, left side, and top views of the jig;

FIG. 5 is a partial perspective view of one embodiment of the clamp for holding the workpiece relative to the jig.

DETAILED DESCRIPTION

Figure 1:
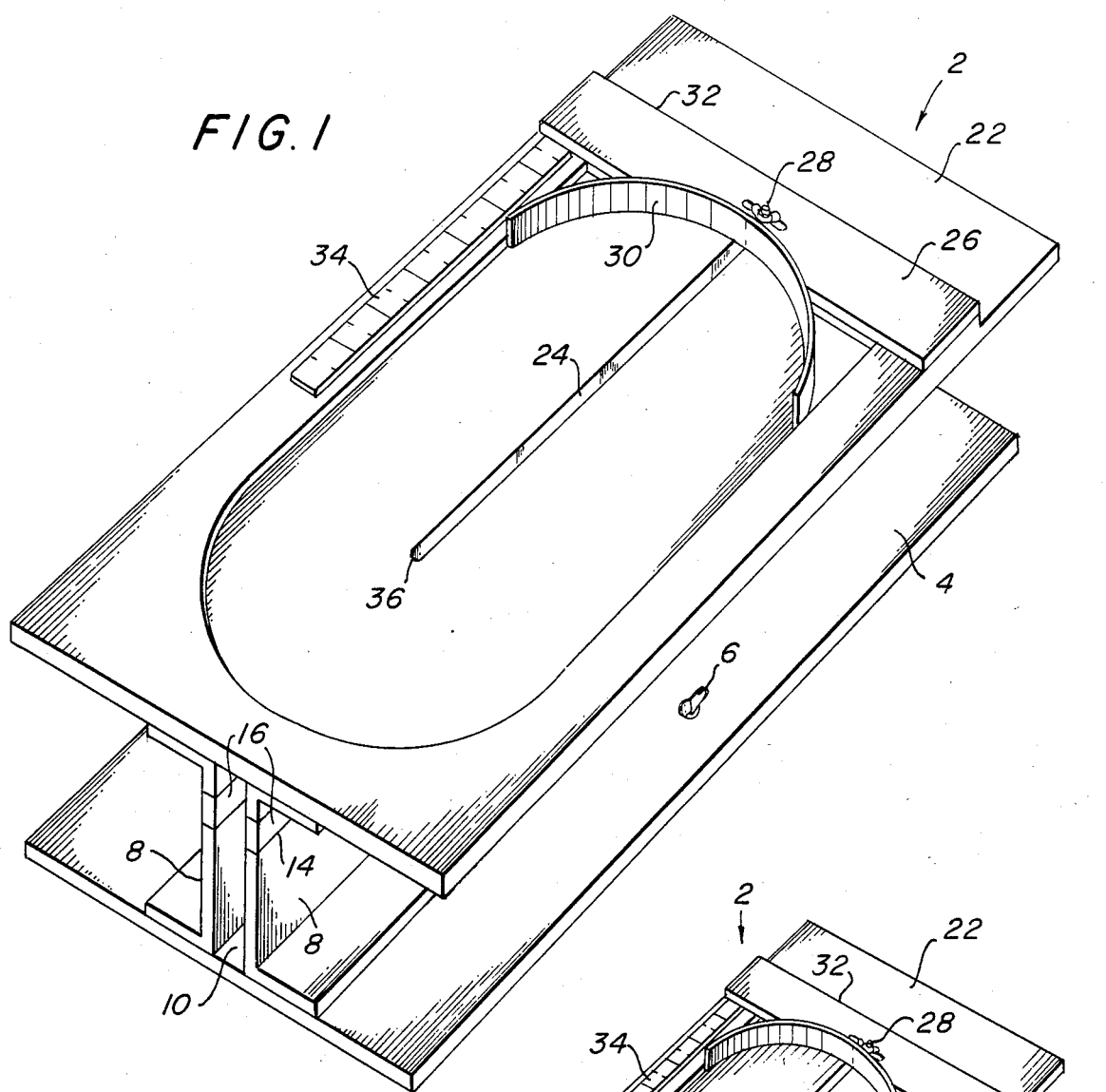
FIG. 1 is a perspective view of the mortise and tenon jig according to the invention.

As shown in the drawing, the mortise and tenon jig 2 of the present invention includes a planar base 4 including apertures 6 for securing the jig to a fixed horizontal support such as a workbench or the like. More particularly, any suitable fastening devices such as screws, nails, or studs may pass through the apertures to secure the jig.

Figure 6:
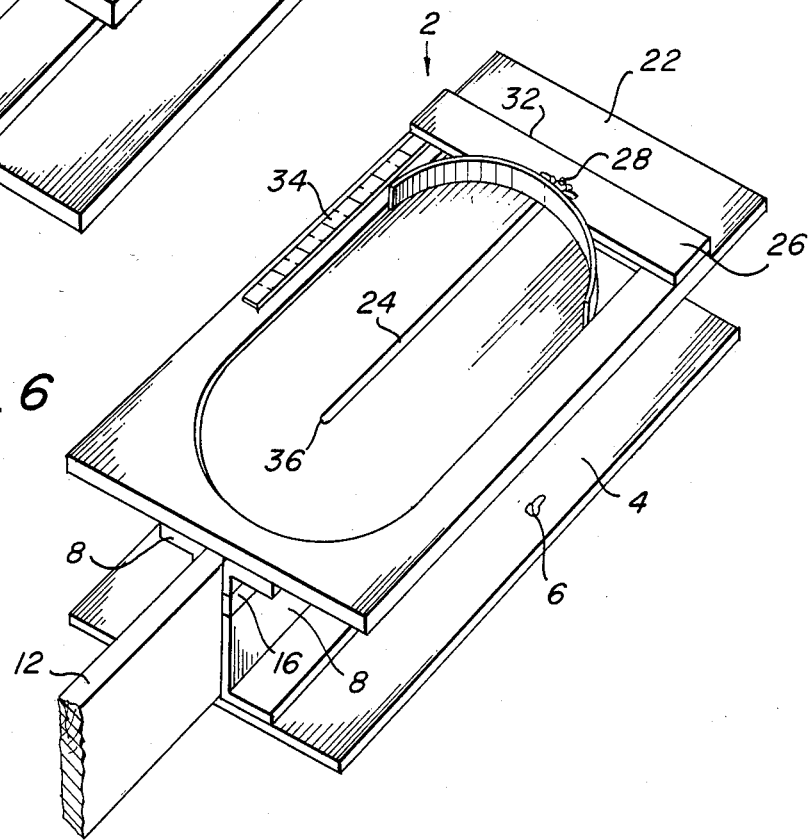
FIG. 6 is a perspective view illustrating a workpiece connected with the jig.

A pair of side walls 8 are connected with and extend vertically relative to the horizontal base. As shown in FIGS. 1 and 3, the side walls are arranged parallel to one another in spaced relation to define a longitudinal channel 10 adapted to receive a workpiece such as a piece of wood 12 or the like as shown in FIG. 6.

At the end of each side wall are a pair of parallel slots 14 which define side wall portions 16 which may be deflected relative to the side wall. Adjacent each deflection portion, a toggle clamp 18 is connected with the side wall as shown in FIGS. 2 and 3. The toggle clamps are operable between open and clamping positions relative to the side wall deflection portions. More particularly, when the clamps 18 are in the clamping position, the clamps press the side wall deflection portions against the piece of wood 12 arranged in the channel 10 to securely hold the piece of wood during a cutting operation as will be developed in greater detail below.

Alternatively, C-clamps 20 may be provided in lieu of the toggle clamps as shown in FIG. 5 to secure the workpiece in the channel, the C-clamps compressing opposed deflection portions against a workpiece arranged in the channel.

A router guide plate 22 is connected with the upper portion of each side wall 8. The router guide plate is arranged parallel to the base plate 4 and spaced therefrom by the height of the side walls. As shown in the drawing, the channel 10 is thus enclosed on the bottom by the base plate 4, on the top by the router guide plate 22, and on the sides by the side walls 8. The ends of the channel remain open to receive the workpiece from which blind or open mortises or a tenon are formed.

The dimensions of the channel are governed by the spacing between the side walls 8 and the height thereof which may be designed in accordance with the general size of the workpiece. As will be developed below, the jig is particularly useful for forming mortises and tenons from wood used in the manufacture of furniture and cabinetry.

The router guide plate 22 contains a longitudinal through-slot 24 which extends above and affords communication with the channel 10 as shown in the drawing. The through-slot preferably extends only about three-quarters of the length of the router guide plate and thus terminates short of the ends of the router guide plate.

A guide 26 is adjustably connected with the guide plate 22 for sliding displacement relative to the slot 22. More particularly, the underside of the router guide plate contains a dado (not shown) extending along the slot 24. The guide contains apertures for receiving a bolt whose head is arranged in the dado. A wing nut 28 is connected with the bolt. When the nut is loosened, the guide plate and bolt are displaced relative to the slot 24 to a selected position, following which the nut is tightened to secure the guide in the selected position. As shown in the drawing, one end surface 30 of the guide has a concave configuration, while the other end surface of the guide has a linear configuration extending parallel to the end of the router guide plate.

A scale 34 is provided on the router guide plate to assist in setting the guide 26 in a selected position.

The entire jig 2 may be formed of any suitable material such as a synethtic plastic, wood, or metal. The jig is adpated for use with a router to form both blind and open mortises in a workpiece or to form a tenon from the workpiece.

OPERATION

The workpiece is cut to the dimension necessary and the location of the mortises to be cut are marked. For example, for a 2" blind mortise, a straight line is drawn 1⅞" from the end. The workpiece is inserted into the channel with the line aligned with the end 36 of the slot 22 and the clamps are moved to their clamping position to secure the workpiece within the channel. The guide is then positioned to 1¾" with the tool bit of the router set to a ⅝" depth. This will provide a ⅝" mortise. A router (not shown) is positioned in the jig 2 with the back side of the router against the concave end portion 30 of the guide 26. The router is preferably tilted with its back end up and the front end engaging the jig. The tilted position enables the operator to proceed straight into the workpiece and prevents the router from wandering. The router is then lowered into the wood. When the router is flat, the operator pulls it until it abuts the end 36 of the slot, whereby a blind mortise is completely formed.

For forming an open end mortise, a similar procedure is followed except that the guide is positioned at the far end of the slot 24 relative to the end 36. The router is inserted into the slot 24 beyond the end of the workpiece. The router is then drawn toward the slot end 36 to completely form the open end mortise.

In order to form a tenon from a workpiece, two adjustments are necessary. The guide 26 is positoned at the end of the slot 24 remote from the end 36. The router is used with a ball bearing rabbet cutter. A ¼" rabbet is run on each side of the workpiece which is then cut to a desired dimension and inserted into the channel and clamped with ⅜" of material extending beyond the guide plate 22. The router rabbet depth is set to ⅜" and the edge of the router is placed against the linear end 32 of the guide 26. The router is then drawn across the guide until the end of the tenon is cut.

While in accordance with the provisions of the Patent Statute the preferred forms and embodiments of the invention have been illustrated and described, it will be apprarent to those skilled in the art that various changes and modifications may be made without deviating from the inventive concepts set forth above.

What is claimed is:

1. A jig for assisting in cutting a mortise and tenon from a workpiece, comprising
    (a) a fixed, planar base plate;
    (b) a pair of side walls connected with and arranged normal to said base, said side walls being arranged in a spaced parallel configuration defining a longitudinal channel adapted to receive the workpiece;
    (c) a router guide plate connected with said side walls and being arranged spaced from and parallel to said base plate, whereby said channel is open at its ends and closed on its top and bottom by said router guide plate and said base plate, respectively, and on its sides by said side walls, said router guide plate containing a longitudinal through-slot extending above and affording communication with said channel; and
    (d) guide means adjustably connected with said guide plate for sliding longitudinal displacement relative to said slot, whereby when the workpiece is arranged in said channel and said guide means is adjusted to a selected position, a routing device is positioned against one end of said guide means with its cutting tool arranged in and displaced relative to said slot to cut a mortise in the workpiece within said channel, and further when the routing device is positioned against the other end of said guide means with its cutting tool displaced relative to the end of said router guide plate, a tenon is cut in the portion of workpiece protruding from said channel.

2. Apparatus as defined in claim 1, wherein said slot terminates intermediate the ends of said guide plate.

3. Apparatus as defined in claim 2, and further comprising clamping means connected with said side walls for clamping the workpiece in a given position within said channel during the routing operation.

4. Apparatus as defined in claim 3, wherein said clamping means comprises a C-clamp.

5. Apparatus as defined in claim 3, wherein said clamping means comprises a toggle clamp.

6. Apparatus as defined in claim 3, wherein said one end of said guide means has a concave configuration.

7. Apparatus as defined in claim 3, wherein said other end of said guide means has a linear configuration extending normal to the longitudinal direction of said slot.

8. Apparatus as defined in claim 3, wherein said side walls each include a pair of parallel slots adjacent said clamping means to define a deflection portion, whereby when said clamping means are closed to the clamping condition, said clamping means press said deflection portions against the workpiece.

9. Apparatus as defined in claim 3, wherein said router guide plate includes a scale extending parallel to said slot for indicating an appropriate setting for said guide means.

* * * * *

UNITED STATES PATENT AND TRADEMARK OFFICE
CERTIFICATE OF CORRECTION

PATENT NO.   :   4,595,040

DATED        :   June 17, 1986

INVENTOR(S) :   Rudy L. Glismann

It is certified that error appears in the above-identified patent and that said Letters Patent is hereby corrected as shown below:

In the heading, Item (19) and (76) correct the inventor's name to read  -- Rudy L. Glismann --..

Signed and Sealed this

Fourteenth Day of October, 1986

[SEAL]

Attest:

DONALD J. QUIGG

*Attesting Officer*   *Commissioner of Patents and Trademarks*